United States Patent [19]

Obara

[11] Patent Number: 4,510,367
[45] Date of Patent: Apr. 9, 1985

[54] WIRE-CUT ELECTRIC DISCHARGE MACHINE

[75] Inventor: Haruki Obara, Sagamihara, Japan

[73] Assignee: Fanuc Ltd., Tokyo, Japan

[21] Appl. No.: 505,478

[22] Filed: Jun. 17, 1983

[30] Foreign Application Priority Data

Jun. 30, 1982 [JP] Japan .................. 57-112807

[51] Int. Cl.³ .............................................. B23P 1/08
[52] U.S. Cl. ............................ 219/69 W; 219/69 C
[58] Field of Search ............... 219/69 G, 69 W, 69 C, 219/69 S

[56] References Cited

U.S. PATENT DOCUMENTS

| | | | |
|---|---|---|---|
| 3,731,045 | 5/1973 | Ullmann et al. | 219/69 W |
| 4,363,948 | 12/1982 | Itoh | 219/69 W |
| 4,366,359 | 12/1982 | Yatomi et al. | 219/69 W |

FOREIGN PATENT DOCUMENTS

| | | | |
|---|---|---|---|
| 66092 | 6/1978 | Japan | 219/69 W |
| 65033 | 5/1980 | Japan | 219/69 W |
| 52129 | 5/1981 | Japan | 219/69 W |

Primary Examiner—M. H. Paschall
Attorney, Agent, or Firm—Staas & Halsey

[57] ABSTRACT

In a wire-cut electric discharge machine the accurate thickness of a workpiece is obtained, on the basis of which electric cutting conditions are automatically changed over. The workpiece and a wire electrode are moved relative to each other through utilization of a servo feed system to cut the workpiece by discharge into a desired shape. Cutting current detecting means detects a true cutting current which contributes to electric discharge machining, and feed rate detecting circuitry detects the relative feed rate of the workpiece and the wire electrode. Thickness detecting circuitry detects the thickness of the workpiece by calculation on the basis of the detected true cutting current and the width of a cutting groove separately input. Control circuitry automatically changes over the electric cutting conditions on the basis of the detection result by the thickness detecting circuitry.

4 Claims, 3 Drawing Figures

FIG. 3

| THICKNESS OF WORKPIECE | NO-LOAD VOLTAGE | PEAK CURRENT | ON TIME | OFF TIME |
|---|---|---|---|---|
| $h_1$ | $V_{S1}$ | $I_{P1}$ | $T_{ON1}$ | $T_{OFF1}$ |
| $h_2$ | $V_{S2}$ | $I_{P2}$ | $T_{ON2}$ | $T_{OFF2}$ |
| $h_3$ | $V_{S3}$ | $I_{P3}$ | $T_{ON3}$ | $T_{OFF3}$ |
| $h_4$ | $V_{S4}$ | $I_{P4}$ | $T_{ON4}$ | $T_{OFF4}$ |
| ----- | ----- | ----- | ----- | ----- |
| $h_{n-1}$ | $V_{S(n-1)}$ | $I_{P(n-1)}$ | $T_{ON(n-1)}$ | $T_{OFF(n-1)}$ |
| $h_n$ | $V_{Sn}$ | $I_{Pn}$ | $T_{ONn}$ | $T_{OFFn}$ |

WIRE-CUT ELECTRIC DISCHARGE MACHINE

BACKGROUND OF THE INVENTION

1. Field of the Invention

The present invention relates to improvement in a wire-cut electric discharge machine which employs a servo feed method that controls the relative feed rate of a workpiece and a wire electrode so that a mean machining voltage is held substantially constant. More particularly, the invention pertains to a wire-cut electric discharge machine which is adapted to change electrical cutting conditions in accordance with the thickness of a workpiece for efficiently electric discharge machining the workpiece.

2. Description of the Prior Art

In the case of cutting a workpiece through the use of a wire-cut electric discharge machine of the type moving the workpiece and a wire electrode relative to each other and cutting the workpiece by a discharge into a desired shape, efficient cutting can be achieved by making electrical cutting conditions (a no-load voltage, a peak current, ON time, etc.) large in proportion to the thickness of the workpiece.

On account of this, there has also been proposed a wire-cut electric discharge machine adapted to switch the electrical cutting conditions in accordance with the thickness of the workpiece. But, the conventional machine of this kind possesses the following defect. The prior art machine adopts a servo feed to controls the relative feed rate of the workpiece and the wire electrode so that the mean cutting voltage may be constant. This machine determines the thickness of the workpiece on the basis of the feed rate (which decreases with an increase in the thickness of the workpiece) and switches the electrical cutting conditions on the basis of the result of the thickness determination. Accordingly, the reduction in a feed rate due to an arc discharge which does not machine the workpiece but only makes the workpiece surface rough, is regarded to have resulted from an increase in the thickness of the workpiece. Accordingly the electrical cutting conditions are erroneously made large, resulting in further degradation of the state of discharge.

SUMMARY OF THE INVENTION

It is therefore an object of the present invention to provide a wire-cut electric discharge machine which is adapted to detect a correct thickness of a workpiece and to switch the electrical cutting conditions on the basis of the detected thickness, thereby ensuring efficient and accurate electric discharge machining.

Another object of the present invention is to provide a wire-cut electric discharge machine which is designed to eliminate the possibility of erroneously changing the electrical cutting conditions during an arc discharge, to deteriorate the state of discharge.

Briefly stated, the wire-cut electric discharge machine of the present invention is equipped with a servo function for moving the workpiece and the wire electrode relative to each other and ensuring that mean cutting voltage is sustantially constant. The wire-cut electric discharge machine of the present invention is provided with cutting current detecting means for detecting a cutting current that contributes to electric discharge machining (a true machining current) except currents that do not contribute to the electric discharge machining, such as a short-circuit current and an arc current across the spark gap; feed rate detecting means for detecting the relative feed rate of the workpiece and the wire electrode; input means for entering the width of a cutting groove, such as a keyboard or the like; and thickness detecting means for detecting the thickness of the workpiece on the basis of the current detected by the cutting current detecting means and the feed rate detected by the feed rate detecting means and the width of the cutting groove entered from the input means. The electrical cutting conditions are automatically switched by control means on the basis of the thickness detected by the thickness detecting means.

BRIEF DESCRIPTION OF THE DRAWINGS

FIG. 3 is a table showing the stored contents of a memory.

DESCRIPTION OF THE PREFERRED EMBODIMENTS

Figure 1:
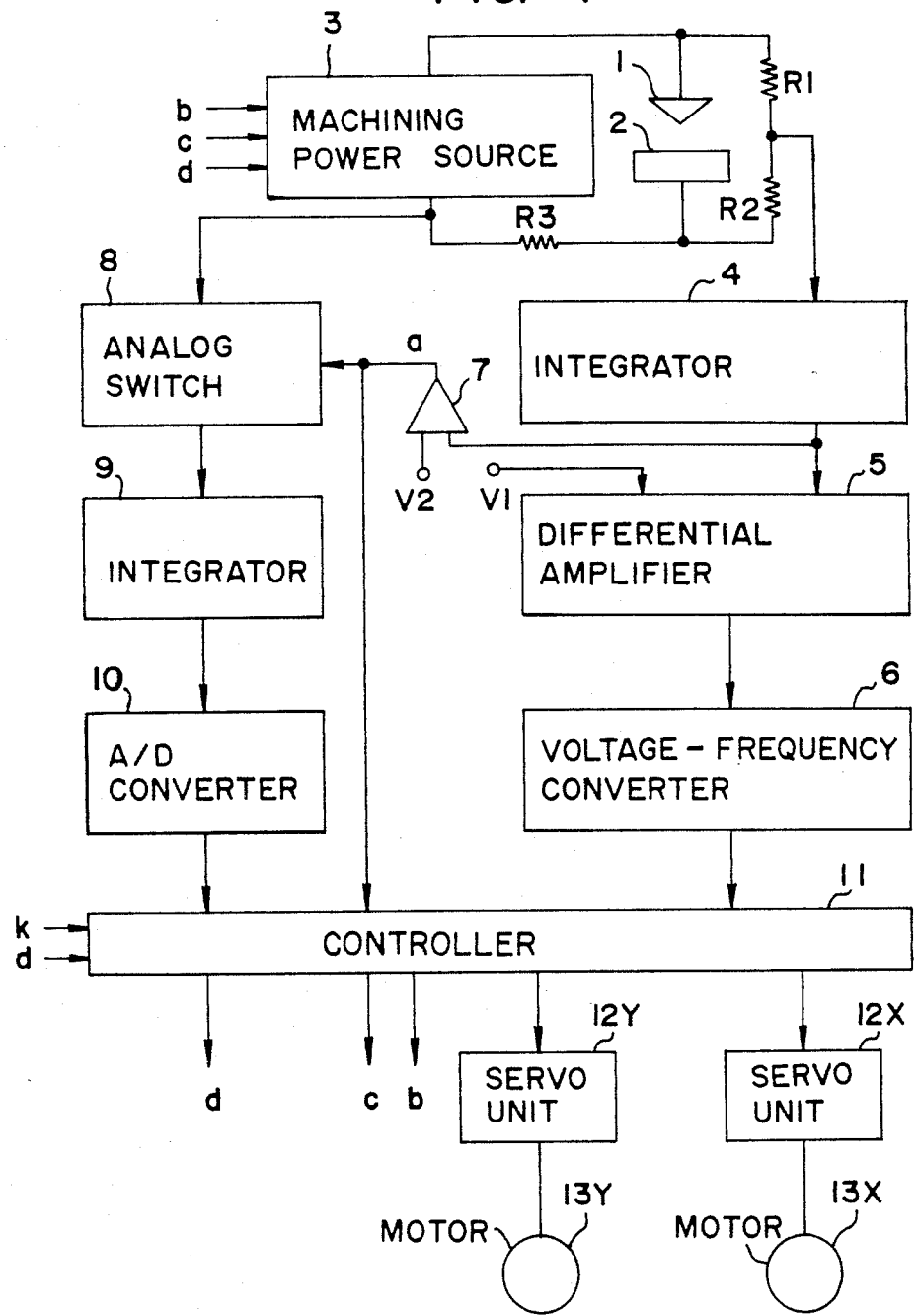
FIG. 1 is a block diagram illustrating an embodiment of the present invention.

To facilitate a better understanding of the present invention, a description will be given of the principle of the invention. Incidentally, the present invention is applied to a wire-cut electric discarge machine which is equipped with a servo feed function for controlling the relative feed rate of a workpiece and a wire electrode so that the mean cutting voltage may be substantially constant.

The quantity of cutting W of the workpiece, per unit time via wire-cut electric discharging using rectangular current pulses as discharge pulses can be expressed by expression (1).

$$W = d \cdot h \cdot F = \eta \cdot V_G \cdot I_P \cdot \tau \cdot f = \eta \cdot V_G \cdot I_T \quad (1)$$

In expression (1), d is the width of the cutting groove, h is the thickness of the workpiece, F is the relative feed rate of the wire electrode and the workpiece, $\eta$ is efficiency, $V_G$ is a gap voltage, $I_P$ is a peak current, $\tau$ is the width of each pulse current flowing across the spark gap (hereinafter referred to as the actual current pulse width), f is the discharge frequency and $I_T$ is a mean of cutting currents contributing to electric discharge machining (hereinafter referred to as the mean true cutting current), not including a short-circuit current and an arc current across the spark gap.

Expression (2) can be obtained from expression (1).

$$h = \eta \cdot V_G \cdot \frac{I_T}{F \cdot d} \quad (2)$$

The efficiency $\eta$ and the gap voltage $V_G$ vary mainly with the quality of the workpiece and the wire electrode, but they can be regarded as substantially constant if the quality of the workpiece does not change during cutting. Accordingly, expression (2) can be rewritten as follows:

$$h = K \cdot \frac{I_T}{F \cdot d} \quad (3)$$

where K is a constant which is dependent upon the quality of the wire electrode and workpiece material.

Because the thickness h of the workpiece can be determined by obtaining the true cutting current $I_T$, the feed rate F and the width of the cutting groove d, and then carrying out the calculation of expression (3), it is possible to switch the electrical cutting conditions in accordance with to the thickness h. In this case, the thickness h is obtained on the basis of the true cutting current $I_T$, and hence is free from the arc current which does not contribute to the electric discharge machining; therefore, an accurate thickness of the workpiece can be obtained. The above is a description applies to machining using a rectangular current pulses but, it has been ascertained that exactly the same result can be obtained when employing wire-cut electric discharge machining of the type using the discharge of a capacitor.

FIG. 1 is a block diagram of a wire-cut electric discharge apparatus which embodies the present invention. Reference numeral 1 indicates a wire electrode; 2 designates a workpiece; 3 identifies a cutting power source; 4 denotes an integrator; 5 represents a differential amplifier for amplifying the difference between a reference voltage $V_1$ and the output of the integrator 4; 6 shows a voltage-frequency converter; 7 refers to a comparator for comparing a reference voltage $V_2$ and the output of the integrator 4 and yields a "1" at its output a, when the output of the integrator 4 is larger than the reference voltage $V_2$; 8 signifies an analog switch which is "ON" while the output a of the comparator 7 is at "1"; 9 indicates an integrator; 10 designates an A/D converter; 11 identifies a numerical controller; 12X and 12Y denote X-axis and Y-axis servo units, respectively; 13X and 13Y represent X-axis and Y-axis motors for moving the wire electrode 1 and the workpiece 2 relative to each other; and R1 to R3 show resistors.

The integrator 4 smooths the voltage across the wire electrode 1 and the workpiece 2 which is voltage-divided by the resistors R1 and R2. The output of the integrator 4 corresponds to the mean cutting voltage. The differential amplifier 5 amplifies the difference between the output of the integrator 4 and the reference voltage V1 and applies the amplified difference to the voltage-frequency converter 6. The numerical controller 11 distributes pulse signals received from the voltage-frequency converter 6, generates signals for controlling the operation of motors 13X and 13Y and provides the control signals to the servo units 12X and 12Y. These control signals cause the wire electrode 1 and the workpiece 2 to move relative to each other at a speed such that the mean cutting voltage may be constant. Since the above-described operation is well-known in the art, no detailed description will be given thereof.

The comparator 7 compares the output of the integrator 4 and the reference voltage V2. As long as the reference voltage V2 remains lower than the integrator output, the comparator 7 yields a "1" at its output a, based on the assumption that the discharge between the wire electrode 1 and the workpiece 2 is normal. While the reference voltage V2 is higher than the integrator output, the comparator 7 yields a "0" at the output a, based on the assumption that the wire electrode 1 and the workpiece 2 are arcing. The output of the comparator 7 is provided to the analog switch 8 and the numerical controller 11. Consequently, only while the discharge between the wire electrode 1 and the workpiece 2 is normal is a current signal, from the current detecting resistor R3, applied via the analog switch 8 to the integrator 9. The integrator 9 smoothes the current signal received from the analog switch 8 and provides the smoothed signal to the A/D converter 10, the output of which corresponds to the true cutting current. Incidentally, the reference voltage V2 is set to a value intermediate between the output voltage of the integrator 4 during normal discharge and the lower output voltage of the integrator 4 during the arc discharge.

Figure 2:
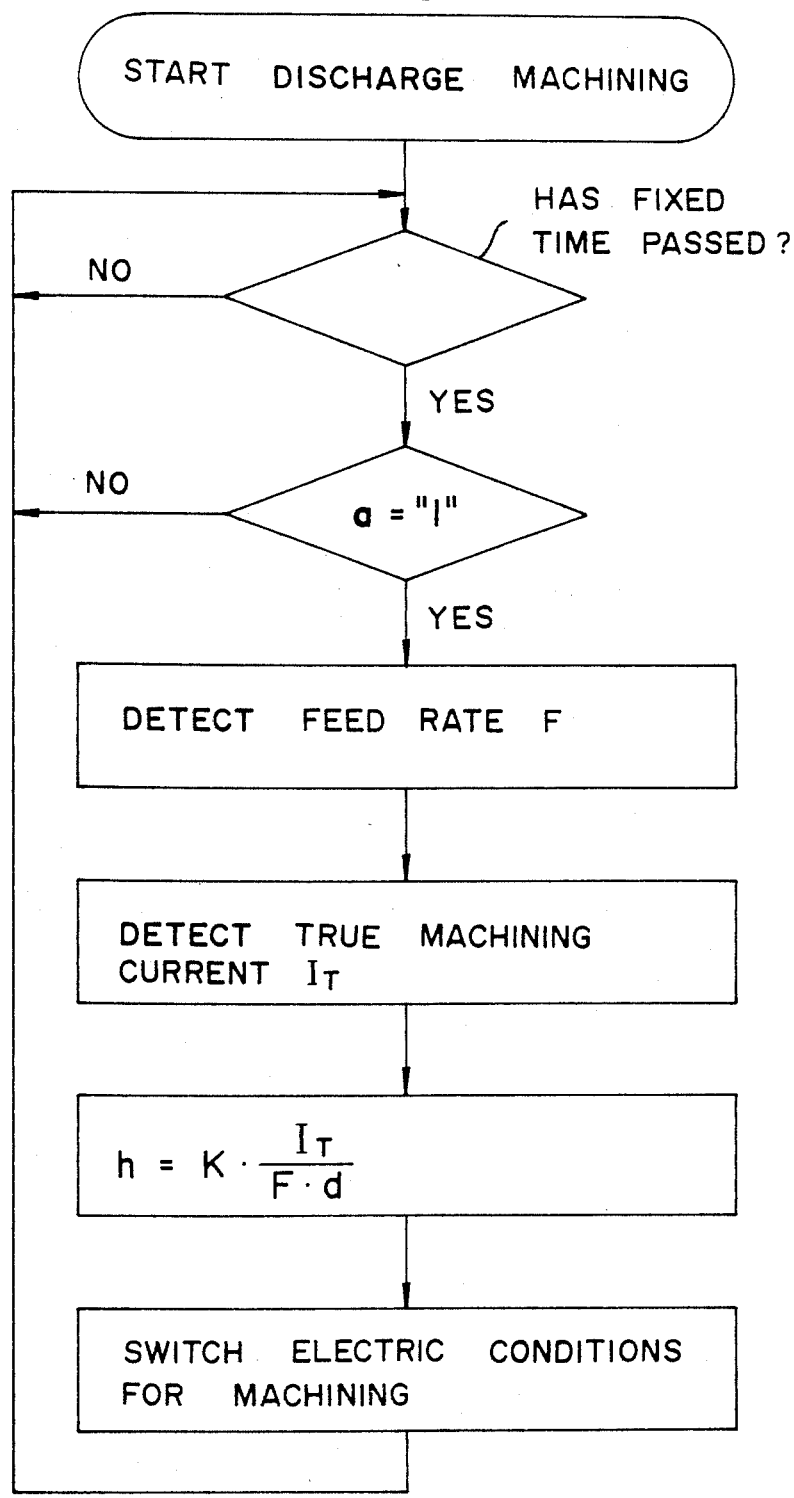
FIG. 2 is a flowchart showing the operation of the embodiment illustrated in FIG. 1.

The numerical controller 11 controls the motors 13X and 13Y and, further, performs at regular time intervals the processing illustrated in the flowchart of FIG. 2. This processing uses the output of the voltage-frequency converter 6, the output of the A/D converter 10, and constant K dependent on the quality of the workpiece and the wire electrode and the width of the citting groove d which are entered from the external keyboard or the like (not shown). The width of the cutting groove d is obtained by test cutting in advance. Next, a description will be given, with reference to FIG. 2, of the operation of the above-described embodiment of FIG. 1.

The numerical controller 11 detects at regular time intervals or not the output a, of the comparator 7 is a "1". When the output is a "1" the controller determines the relative feed rate F of the wire electrode 1 and the workpiece 2, the determination being on the basis of the output of the voltage-frequency converter 6. The controller 11 obtains the true cutting current $I_T$ on the basis of the output of the A/D converter 10 and then calculates expression (3) to obtain the thickness h of the workpiece 2.

A memory (not shown) of the numerical controller 11 stores no-load voltages $V_{S1}$ to $V_{Sn}$, peak currents $I_{P1}$ to $I_{pn}$, ON times $T_{ON1}$ to $T_{ONn}$ and OFF times $T_{OFF1}$ to $T_{OFFn}$ corresponding to workpiece thicknesses $h_1$ to $h_n$ (where $h_{n-1} < h_n$). This data is shown in FIG. 3. After obtaining the thickness h from expression (3), the numerical controller 11 compares the thickness h with the thicknesses $h_1$ to $h_n$ stored in the memory and switches the electrical cutting conditions on the basis of the comparison. For example, if $h_1 < h < h_2$, then the numerical controller 11 reads out the electrical cutting conditions $V_{S1}$, $I_{P1}$, $T_{ON1}$ and $T_{OFF1}$ corresponding to the thickness $h_1$ and produces control signals b, c and d for controlling the no-load voltage, the peak current and the ON-OFF time on the basis of such electrical cutting conditions. These control signals are provided to the cutting power source 3 to change over the electrical cutting conditions. That is, if $h_{n-1} < h < h_n$, the electrical cutting conditions are set to the values corresponding to the thickness $h_{n-1}$. It is a matter of course that the electrical cutting conditions corresponding to the thickness $h_{n-1}$ generate a smaller cutting power than the electrical cutting conditions corresponding to the thickness $h_n$.

While in the foregoing the constant K is described as being entered from a keyboard, it is also possible to prestore constants $K_1$ to $K_m$ corresponding to various materials of workpieces and wire electrodes in the numerical controller 11 for selection by the user. When the constant K is not prestored in the numerical controller 11, it may also be automatically calculated, stored and used in the following manner. In wire-cut electric discharge machining, it is customary to conduct a test cutting to measure and check the width of the cutting groove, the stability of cutting and so forth prior to actual cutting. During this test cutting the electric cutting conditions are properly selected and set and the thickness h of the workpiece to be cut is entered into the numerical controller 11 from a keyboard or the like. In this state, cutting is carried out and both the true cutting current $I_T$ and the feed rate F occurring during the cutting, are stored in the numerical controller 11. After the test cutting, the width of the cutting groove d is measured and input into the numerical controller 11. Then the numerical controller 11 can store the constant K after calculating it, using the expression (4) which is derived from expression (3):

$$K = \frac{F \cdot d \cdot h}{I_T} \quad (4)$$

Accordingly, in subsequent machining when a workpiece of the same material is cut using a wire electrode of the same material, the constant K prestored as described above can be employed, so that even if the thickness of the workpiece differs from the thickness of the test workpiece cut, it is possible to automatically decide the thickness and change over the electrical cutting conditions.

Although the present invention has been described as being applied to a wire-cut electric discharge machine using a servo feed system to control the feed rate such that the mean cutting voltage may be constant, the invention is also applicable to a wire-cut electric discharge machine which is adapted to make the mean cutting current constant or employing some other servo feed system.

As has been described in the foregoing, the wire-cut electric discharge machine of the present invention is equipped with cutting current detecting means (which comprises, for example, the comparator 7, the analog switch 8 and the integrator 9 in the embodiment) for detecting a true cutting current; feed rate detecting means (which comprises, for example, the voltage-frequency converter 6 and the numerical controller 11 in the embodiment); input means for inputting the width of the cutting groove, such as a keyboard and thickness detecting means (which comprises, for example, the cutting power source 3 and the numerical controller 11 in the embodiment) for detecting the thickness of a workpiece on the basis of the true cutting current, the feed rate and the width of the cutting groove. Therefore, the wire-cut electric discharge machine of the present invention is capable of changing over the electric cutting conditions in accordance with the thickness of the workpiece, and hence permits efficient electric discharge machining. Furthermore, since the thickness of the workpiece is obtained on the basis of the true cutting current, there is no possibility of making the electric cutting conditions large during arcing across the spark gap to degrade the state of discharge as in the prior art. Consequently, highly accurate electric discharge machining can be achieved.

It will be apparent that many modifications and variations may be effected without departing from the scope of the novel concepts of the present invention.

What is claimed is:

1. A wire-cut electric discharge machine having a servo feed system in which a workpiece and a wire electrode are moved relative to each other to cut, in accordance with electric cutting conditions, the workpiece via a discharge into a desired shape, said machine comprising:
   cutting current detecting means for detecting a true cutting current;
   feed rate detecting means for detecting the relative feed rate of the workpiece and the wire electrode;
   input means for inputting the width of a cutting groove;
   thickness detecting means for detecting the thickness of the workpiece on the basis of the current detected by the cutting current detecting means, the feed rate detected by the feed rate detecting means and the width of the cutting groove from the input means; and
   control means for changing over the electric cutting conditions on the basis of the thickness determined by the thickness detecting means.

2. A wire-cut electric discharge machine having a servo feed system for moving a workpiece and wire electrode with respect to each other and for electric discharge machining, in accordance with electric cutting conditions, the workpiece by generating a discharge between the wire electrode and the workpiece, said machine comprising:
   first receiving means, operably connectable to the workpiece and to the wire electrode, for detecting the current flowing through the workpiece and the discharge voltage between the workpiece and the wire electrode;
   cutting current detecting means, operatively connected to said first receiving means, for detecting a true current contributing to the electric discharge machining;
   feed rate detecting means, operatively connected to said first receiving means and to said cutting current detecting means, for detecting the relative movement of the workpiece and the wire electrode and for controlling said feed rate so as to maintain said discharge voltage at a constant magnitude;
   second receiving means for receiving and storing the width of the electric discharge machining groove;
   thickness detecting means, operatively connected to said feed rate detecting means and to said second receiving means, for detecting the thickness of the workpiece in accordance with said true current, said detected feed rate and said width; and
   control means, operatively connected to said thickness detecting means and connectable to the workpiece and to the wire electrode, for controlling the cutting conditions in accordance with said detected thickness.

3. A wire-cut electric discharge machine according to claim 2, wherein said cutting current detecting means comprises:
   first integration means for integrating the discharge voltage and for providing a mean cutting voltage;
   comparator means, operatively connected to said first integrating means and to receive a comparison voltage, for providing a compare output when said mean cutting voltage is greater than said comparison voltage;
   switch means, operatively connected to receive said current flowing through the workpiece, for providing a switched current output in response to said compare output; and
   second integrator means for integrating said switched current output and for providing said true current.

4. A wire-cut electric discharge machine according to claim 2, wherein said thickness detecting means detects the thickness in accordance with $h = k * (I_T/F*d)$, where k is a constant selected in accordance with the workpiece and the wire electrode, $I_T$ corresponds to said true current, F corresponds to said detected feed rate and d corresponds to said width.

* * * * *

UNITED STATES PATENT AND TRADEMARK OFFICE
CERTIFICATE OF CORRECTION

PATENT NO. : 4,510,367
DATED : April 9, 1985
INVENTOR(S) : Obara

It is certified that error appears in the above-identified patent and that said Letters Patent is hereby corrected as shown below:

Column 1, line 30, "adopts" should be --uses--;
         line 30, "controls" should be --control--.

Column 4, line 22, after "intervals" insert --whether--.

Signed and Sealed this

Third Day of September 1985

[SEAL]

Attest:

DONALD J. QUIGG

Attesting Officer    Acting Commissioner of Patents and Trademarks - Designate